United States Patent [19]

Michel et al.

[11] 4,347,325

[45] Aug. 31, 1982

[54] POTASSIUM-ALUMINUM-PHOSPHATE COMPOSITIONS

[75] Inventors: Christian G. Michel, Ossining; Carolyn A. Ertell, Yonkers; Johst H. Burk, Mohegan Lake, all of N.Y.

[73] Assignee: Stauffer Chemical Company, Westport, Conn.

[21] Appl. No.: 210,906

[22] Filed: Nov. 28, 1980

[51] Int. Cl.$^3$ .................................................. C04B 1/00
[52] U.S. Cl. ............................................. 501/1; 501/48; 501/153; 106/86; 106/87; 264/42; 264/43
[58] Field of Search ............ 423/306; 106/40 R, 73.4, 106/86, 87, 47 R; 264/42, 43; 501/1, 153

[56] References Cited

U.S. PATENT DOCUMENTS

| | | | |
|---|---|---|---|
| 3,148,996 | 9/1964 | Vukasovich | 106/86 |
| 3,223,537 | 12/1965 | Wiegert | 106/40 R |
| 3,311,448 | 3/1967 | Blanch | 423/306 |
| 3,330,675 | 7/1967 | Magder | 106/40 R |
| 3,352,814 | 5/1967 | Collins et al. | 260/41 |
| 3,382,082 | 5/1968 | Eubanks | 106/40 R |
| 3,625,723 | 12/1971 | Sicka | 106/40 R |
| 4,207,113 | 6/1980 | Yoshina et al. | |

OTHER PUBLICATIONS

U.S. Bureau of Mines, I.C. 8483 (1970) p. 2.
U.S. Bureau of Mines, Technical Paper 669 (1944) pp. 2, 5, 6.

*Primary Examiner*—Brian E. Hearn

[57] ABSTRACT

Novel self-setting potassium-aluminum-phosphate compositions of matter are prepared by forming an aqueous slurry of a potassium source, an aluminum source and a phosphate source; mixing the slurry for a period of time sufficient to form a reactive, creamy mass having a viscosity of at least 2000 cps; and setting or curing the reactive creamy mass. The product is porous, can be foamed or nonfoamed, adheres well to substrates and when foamed, can be lightweight.

89 Claims, No Drawings

POTASSIUM-ALUMINUM-PHOSPHATE COMPOSITIONS

BACKGROUND OF THE INVENTION

The present invention relates to new aluminum phosphate compositions of matter and to a process for the preparation thereof. More particularly, the present invention relates to novel potassium-aluminum-phosphate compositions of matter.

There are a number of aluminum-phosphate compositions of matter known in the art. These are frequently referred to in the prior art as "ceramic" or "foamed ceramic" materials.

U.S. Pat. No. 3,330,675 describes one such foamed ceramic material. This material, according to the patent, is described by mixing a solution of acid aluminum phosphate of suitable composition with a "basic compound", which is further defined in the patent, in the presence of a substance which liberates a gas during or after the mixing process. The resulting product is said to set in about 10 minutes to form a useful porous cellular product without the application of heat from any external source.

U.S. Pat. No. 4,207,113 discloses an inorganic foamed composition comprising metallic salts of phosphoric acid, containing discrete cells of closed cellular structure. In accordance with the patent, the inorganic foam is formed by first preparing a stable aqueous solution of metal phosphate having a specific metal/phosphate ratio, and then subjecting that solution to simultaneous foaming and setting by addition of a basic carbonate of polyvalent metals thereto.

SUMMARY OF THE INVENTION

We have now discovered a new aluminum-phosphate composition of matter which has an unusual range of desirable properties and which can be prepared in foamed as well as unfoamed forms. This novel composition of matter is prepared from water, a potassium source, a source of aluminum and a phosphate source. In a preferred embodiment of the present invention, the ingredients are first combined to form a slurry and then the slurry so formed is mixed under controlled conditions until it becomes a reactive creamy mass having a viscosity of at least 2000 cps. The reactive creamy mass is then allowed to set at room temperature or cured at elevated temperatures to form the novel compositions.

DETAILED DESCRIPTION OF THE INVENTION

In accordance with the present invention there is provided an article of manufacture resulting from the setting or curing of a reactive mass formed by mixing (a) a potassium source, (b) an aluminum source, (c) a phosphate source and (d) water for a period of time sufficient to form a reactive, creamy, smooth mass. The mixing is preferably conducted at a temperature ranging from about 10° C. to about 80° C., although a range of 20° C. to 60° C. is more preferred and a temperature of about 40° C. is most preferred.

In accordance with the present invention, there is provided a potassium-aluminum-phosphate composition of matter having the nominal formula:

$$(K_2O)_x(Al_2O_3)_y(P_2O_5)_8(H_2O)_n$$

wherein x represents a number ranging from about 0.3 to about 2, y represents a number ranging from about 3 to about 15 and n represents a number ranging up to about 100; comprising a hydrated oxide of aluminum and at least one potassium-aluminum-phosphate crystalline species selected from the group consisting of:

$K Al_3H_8(PO_4)_6.6H_2O$ $K Al_3H_{14}(PO_4)_8.4H_2O$ $K_3 Al_5H_6(PO_4)_8.18H_2O$ self-bound into a solid mass.

In particularly preferred embodiments, x and y have the following combinations of values.

| x | y |
|---|---|
| 1 | 6 |
| 1 | 7 |
| 1 | 8 |
| 1 | 10 |
| 1.3 | 6 |
| 1.3 | 8 |
| 1.3 | 10 |

Compositions of the present invention which have been set or cured at temperatures up to about 120° C. can be identified by a characteristic x-ray pattern which is representative of a hydrated aluminum oxide and at least one of the specific potassium-aluminum-phosphates listed above.

The compositions of the present invention can be prepared by a process comprising the steps of (a) mixing a potassium source, an aluminum source, a phosphate source and water at a temperature ranging from about 10° C. to about 80° C. to form a slurry; (b) mixing the slurry for a time sufficient to convert the slurry to a reactive, creamy mass; having a viscosity of at least 2,000 cps; and (c) setting or curing the reactive, creamy mass to form the solid potassium-aluminum-phosphate composition.

The potassium sources which may be used in preparing the novel compositions of the present invention include, but are not limited to potassium oxide, potassium hydroxide, potassium carbonate, potassium bicarbonate and potassium salts of phosphoric acid, such as a monobasic potassium phosphate; although potassium carbonate is preferred because it is relatively easy to handle in this system.

The amount of potassium source used in preparing the initial slurry should preferably be such as to result in the presence of from about 0.3 to about 2 moles of potassium oxide per 8 moles of $P_2O_5$ in the slurry.

The aluminum sources which may be used in the practice of the present invention include, but are not limited to, elemental aluminum and its oxides; such as the hydrated aluminum oxides. Other aluminum sources may also be found useful in preparing the compositions of the present invention, and the invention is not limited to those sources specifically listed. Preferred aluminum sources are the hydrated aluminum oxides.

The amount of aluminum source used in preparing the initial slurry of the present invention should preferably be such as to result in the presence of from about 3 moles to about 15 moles of the aluminum oxide (as $Al_2O_3$) per 8 moles of $P_2O_5$ in the slurry.

There are many phosphate sources which may be used in preparing the compositions. These include, but are not limited to phosphoric acid (preferably at a concentration of at least 75% by weight), phosphorus pentoxide and various salts of phosphoric acid, such as the potassium salts mentioned earlier, as well as metal salts of phosphoric acid, such as $Al(H_2PO_4)_3$. A preferred phosphate source is phosphoric acid having a concentration of about 85%. When phosphoric acid is used as the phosphate source, it can also be the water source.

If too much water is present, either because a low-concentration phosphoric acid was used or too much water was added directly, the time required for the creamy mass to self-set can become unacceptably long and, in extreme cases, the creamy mass may not self-set at all.

If, on the other hand, not enough water is present, either from the phosphoric acid or from the added water, the chemical process by which the ultimate product is formed may not proceed to the degree required and a less desirable product than would otherwise be possible may result.

The total amount of water in the slurry, from whatever source, should preferably range from about 5 to about 12 moles per mole of $P_2O_5$.

The relative amounts of the components may, of course, be varied somewhat from the ranges specified above while keeping within the scope of the present invention.

Particularly preferred slurries within the ranges specified above are characterized by the following component ratios.

| Mole Potassium | Mole Aluminum | Mole Phosphorus |
|---|---|---|
| 1 | 6 | 8 |
| 1 | 7 | 8 |
| 1 | 8 | 8 |
| 1 | 10 | 8 |
| 2 | 6 | 8 |
| 1.3 | 6 | 8 |
| 1.3 | 7 | 8 |
| 1.3 | 8 | 8 |
| 1.3 | 10 | 8 |

The equipment used to form the slurry and, ultimately to convert the slurry to the reactive creamy mass, can be selected from amongst the various equipment which is used to accomplish conventional mixing. High-shear blending is not essential, and specialized homogenizers are not required. Ordinary mixing equipment will generally suffice.

An important step in the preparation of the composition of the present invention resides in the formation of the reactive creamy mass. When preparing the reactive, creamy mass, it is not sufficient to merely achieve a uniform distribution of the individual components, as is the case with an "ordinary" slurry. An "ordinary" slurry will not result in the product of the present invention. To achieve the product of this invention, the mixing of the initial slurry must be continued until it is converted to a reactive, creamy mass having a viscosity of at least 2000 centipoises, or until the onset of formation of the aforementioned crystalline species.

Once all of the ingredients are brought together, the mixing time required to form the reactive, creamy mass can range from a few minutes to several hours.

When phosphoric acid is used as the phosphate source, it will be found particularly convenient to accomplish the mixing of the components by the steps of sequentially (a) mixing the potassium source with the phosphoric acid to form a solution; (b) adding the aluminum source to the solution to form a slurry, and (c) mixing the slurry for a period of time sufficient to form a reactive, creamy mass.

The reactive, creamy mass of the present invention can self-set at room temperature, and optionally can be cured thereafter at an elevated temperature.

The reactive, creamy mass can be used to form objects, such as panels, bricks, billiard balls and the like; fire-proof protective coatings for various substrates such as wood, polyurethane foam and the like; binders, insulators, porous ceramics; and casting material for artistic and utility castings. The product formed by setting the reactive mass at room temperature or curing at temperatures up to about 120° C. is machinable and non-brittle. Substrates, such as plywood panels can be coated with the composition of this invention to form a composite which, after curing, can be cut with a saw without damaging the coating, and through which nails can be driven without substantially damaging the coating. The product of the present invention can be quite shock resistant, resilient and, in many cases, has a naturally smooth and lustrous surface.

The reactive, creamy mass may be set at room temperature and/or cured by heating at elevated temperatures. The properties of the final product are dependent, in part, upon whether the product has been set at room temperature or cured at elevated temperatures and, if cured, the temperature at which it is cured. In this regard the reactive, creamy mass may be "set" at ambient temperatures, "warm cured" at moderately elevated temperatures or "hot cured" at relatively high temperatures.

The "setting" process consists of permitting the reactive, creamy mass to set at ambient temperatures (usually ranging from about 20° C. to about 45° or 50° C.). Substantially complete setting, within practical limitations, can usually be accomplished in from about 1 to about 24 hours. The "set" product is resilient, non-flammable and adheres well to porous materials. This product is particularly useful as a fire-proof coating for articles such as plywood paneling and polyurethane roam. While the coating in and of itself is attractive, due to its smooth lustrous surface, it can be painted or covered with wallpaper and the like.

While the reactive creamy mass can be applied to substrates to form a coating by any of the well-known techniques, it may also be simply poured onto a flat surface and permitted to flow to the outside edges of the surface and stop, thereby forming a "natural" uniform coating over the entire surface.

The "warm curing" process consists of curing the reactive, creamy mass at a temperature ranging from about 45° C. up to about 120° C. The "set" product may also be "warm cured", after setting. The warm cured product has a lower bulk density than the set product, and is more porous. This material is somewhat ceramic-like in appearance.

The warm cured product is preferably prepared by warm curing the set product. Thus, the reactive, creamy mass is first permitted to set at ambient temperatures, and then heated within the temperature range specified for warm curing. Alternatively the reactive mass can be subjected directly to the warm-curing process without having been "set" first.

The "hot curing" process consists of curing the previously-set, or warm-cured product at temperatures ranging from about 120° C. up to about 600° C. or higher. It is preferred not to subject the reactive, creamy mass directly to hot curing, but the same is contemplated as being within the scope of the present invention. The hot-cured product has properties which are much like those of a ceramic material. It is highly water-resistant, and is also resistant to acid and base attack. This material is, however, more brittle than the other two products.

The composition of the present invention may be formulated with various fillers to impart desired properties. Thus, for example, long fiber fillers such as asbestos or fiber glass may be added to provide improved mechanical strength. Other fillers, such as aluminum oxide and other main group metal oxides and their hydrates, iron oxide and other transition metal oxides and their hydrates, silica, mica, calcium silicate, Wollastonite, perlite, vermiculite, sawdust, wood chips, cellulose fiber, glass flake, clay, magnetic powders, magnetic filings, pumice, mixtures thereof and the like may also be added. The total amount of any particular filler which may be added will depend, in part, on the characteristics of the filler, such as bulk density and absorbancy; and the properties desired in the final product.

In another embodiment, the composition of the present invention takes the form of a cellular solid potassium-aluminum-phosphate composition of matter (i.e. a foam). To prepare the foamed material, the reactive mass is prepared as described earlier (either with or without filler), and a foaming agent is added.

There are many foaming agents which may be used. These foaming agents are generally known in the art and it is well within the skill in the art to select an appropriate foaming agent for any particular application. These foaming agents include, but are not limited to sodium carbonate, sodium bicarbonate, potassium carbonate, potassium bicarbonate, air, nitrogen, hydrogen peroxide and the halocarbon blowing agents, such as trichlorofluoromethane. Preferred foaming agents are sodium carbonate, sodium bicarbonate, potassium carbonate and potassium bicarbonate.

The amount of foaming agent which should be added to the reactive mass will vary in accordance with several factors such as, for example, temperature of the mass, viscosity of the mass, composition of the mass (i.e., the relative amount of each ingredient used), amount of filler used, and the like.

The porosity and density of the foamed products or coatings formed are governed by the composition of the initial slurry, the viscosity of the slurry, the process conditions as well as the amount and characteristics of the particular foaming agent used.

In order that the present invention be more fully understood, the following examples are given by way of illustration. No specific details or enumerations contained therein should be construed as limitations to the present invention except insofar as they appear in the appended claims. All parts and percentages are by weight unless otherwise specifically designated.

EXAMPLE 1

Phosphoric acid, at a strength of 85% by weight and in an amount of 845.4 grams was added to a 2,000 ml. beaker equipped with a magnetic stirrer. With the stirrer in operation, 63.2 grams of anhydrous potassium carbonate was slowly added at room temperature. During the addition of the potassium carbonate, the release of $CO_2$ gas was observed. The beaker, containing the resulting clear solution, was then placed in a controlled-temperature bath; and the magnetic stirrer was replaced with an overhead stirrer. A thermometer was placed in the beaker, and 428.8 grams of aluminum hydroxide ($Al_2O_3.3H_2O$) added over a period of about 10 minutes while stirring at about 300 RPM. The temperature of the beaker contents, initially at 30° C., increased to 40° C. due to the resulting exotherm. The beaker contents, now in the form of a slurry and having a potassium:aluminum:phosphorus ratio of 1:6:8, were maintained at 40° C. by the controlled temperature bath. As stirring was continued the viscosity of the beaker contents increased. At a Brookfield viscosity of about 2,000 centipoises a creamy mass began to form. Stirring was continued until the viscosity of the creamy mass reached about 40,000 centipoises, which occurred about 2.8 hours after the initial addition of aluminum hydroxide. The creamy mass was then poured into molds where it self-set at room temperature to form solid molded articles. The material self-set in about an hour, and was then permitted to cure at room temperature for about another 24 hours.

The molded articles, after having cured at room temperature for 24 hours, had a white, lustrous appearance and were in the form of relatively hard solid objects. A weight loss of about 0.2 to 0.5% resulted from the setting and curing. An XRD powder pattern of the cured products was found to exhibit diffraction lines characteristic of $KAl_3H_8(PO_4)_6.6H_2O$, $KAl_3H_{14}(PO_4)_8.4H_2O$, $K_3Al_5H_6(PO_4)_8.18H_2O$ and $Al_2O_3.3H_2O$.

EXAMPLE 2

Molded objects were prepared and allowed to set at room temperature as in Example 1. These objects were then warm-cured in a 50° C. oven for 24 hours. The setting and warm-curing resulted in a cumulative weight loss of about 0.5 to 1.8%, but the objects retained their white lustrous appearance, and were somewhat harder than the room temperature cured objects. An XRD powder pattern of these "warm-cured" compositions exhibited diffraction lines characteristic of $KAl_3H_8(PO_4)_6.6H_2O$, $K_3Al_5H_6(PO_4)_8.18H_2O$ and $Al_2O_3.3H_2O$.

EXAMPLE 3

Molded objects were prepared and allowed to set at room temperature as in Example 1. These objects were then cured at 105°–110° in an oven for about 24 hours. The setting and curing at this elevated temperature resulted in a cumulative weight loss of about 18 to 20%, and the objects, which previously had a lustrous white appearance, became dull-white. The original dimensions were, however, retained. An XRD powder pattern of the cured composition exhibited diffraction lines characteristic of $KAl_3H_8(PO_4)_6.6H_2O$ and $Al_2O_3.3H_2O$.

EXAMPLE 4

Molded objects were prepared and allowed to set at room temperature as in Example 1. These objects were than warm cured in a 230° C. tube furnace for about 24 hours. As a result of this curing the previously white lustrous appearance became dull-white, but the original dimensions of the objects were retained. The setting and curing resulted in a cumulative weight loss of from about 27 to about 34% by weight. An XRD powder pattern of the cured product does not exhibit the diffraction lines characteristic of the crystalline species found in Examples 2 and 3; but does exhibit the diffraction lines which are characteristic of the condensation and dehydration products of the aforementioned crystalline species.

EXAMPLE 5

Molded articles were prepared and allowed to set at room temperature as in Example 1. These objects were then further cured in a tube furnace at 400° C. for about 24 hours. The surface luster became dull, but the objects retained their original dimensions. The setting and curing resulted in a cumulative weight loss of about 35% by weight. An XRD powder pattern of the cured composition does not exhibit the diffraction lines of the crystalline species referred to in the previous examples; but does exhibit diffraction lines characteristic of their respective condensation and dehydration products.

EXAMPLE 6

Molded articles which were prepared and warm-cured as in Example 3 were heat-treated in a tube furnace at 800° C. for about 24 hours. These objects retained their original dimensions but sustained an additional weight loss of about 22%. An XRD powder pattern of the heat-treated objects exhibited peaks which were ascribed to the condensation and dehydration products of the warm-cured 1:6:8 KAlP composition.

EXAMPLE 7

Molded articles prepared and cured in accordance with Example 3 were heat-treated in a tube furnace at 1200° C. for about 24 hours. The physical dimensions of the objects were diminished by about 5 to 9% as a result of the curing, and the objects sustained an additional weight loss of approximately 23%. The cured objects appeared to be somewhat sintered and more brittle than they were prior to having been heat-treated. An XRD powder pattern of the heat-treated objects exhibited peaks which were characteristic of the condensation and dehydration products of the warm-cured 1:6:8 KAlP.

Creamy masses of various compositions were prepared in accordance with the procedure described in Example 1. These creamy masses were then used to prepare molded articles, which were permitted to set at room temperature and then cured at 50° C. The presence or absence of certain crystalline species in the cured articles was then determined by XRD powder diffraction measurements. The results of these determinations are tabulated in Table I.

TABLE I

POTASSIUM ALUMINUM PHOSPHATE SLURRY AND SOLID COMPOSITIONS

| Comp'n Run | Slurry Comp.Mole Ratio K:Al:P | Crystalline Species | | | |
|---|---|---|---|---|---|
| | | $KAl_3H_8(PO_4)_6 \cdot 6H_2O$ | $KAl_3H_{14}(PO_4)_8 \cdot 4H_2O$ | $K_3Al_5H_6(PO_4)_8 \cdot 18H_2O$ | $Al_2O_3 \cdot 3H_2O$ |
| A | 0.3:6:8 | present | present | | present |
| B | 0.5:6:8 | present | present | | present |
| C | 1:5:8 | present | | present | present |
| D | 1:6:8 | present | | present | present |
| E | 1:8:8 | present | | present | present |
| F | 1:10:8 | present | | present | present |
| G | 1.3:6:8 | present | | present | present |
| H | 1.3:8:8 | present | | present | present |
| I | 2:6:8 | present | | present | present |

EXAMPLE 9

A creamy mass was prepared in accordance with the procedure described in Example 1 and used to form objects which were permitted to self-set at room temperature. The material was then cured at 80° C. for a period of 24 hours. A portion of the material which was cured at 80° C. was set aside, and a second portion was further cured at 600° C. for 24 hours.

The relative resistance of the 80° C. cured and 600° C. cured materials to boiling water, hydrochloric acid and sodium hydroxide is shown on Table II.

TABLE II

CHEMICAL RESISTANCE OF WARM-CURED AND HOT-CURED COMPOSITIONS

| Media/Time | % Weight Loss (80° C.) Warm-cured | % Weight Loss (600° C.) Hot cured |
|---|---|---|
| Boiling water/ 6 hrs. | 0.1 | 0.01 |
| 37% HCl, 60° C./ 6 hrs. | 1 | 0.1 |
| 50% NaOH, 60° C./ 6 hrs. | 1 | 0.1 |

The data clearly show that the material which was cured at the higher temperature has greater resistance in all three cases.

The physical properties of the composition which was cured at 600° C. for 24 hours are shown on Table III.

TABLE III

PHYSICAL PROPERTIES OF COMPOSITION CURED AT 600° C.

| Property | Data |
|---|---|
| Density | ~1.6 g/cm$^3$ |
| Compressive strength | 176 kg/cm$^2$ |
| Porosity | 44% |
| Thermal Conductivity | $1.1 \times 10^{-3}$ cal/sec cm °C. |
| Coefficient of thermal expansion | $6.7 \times 10^{-6}$ °C.$^{-1}$ |
| Specific heat | 0.33 cal/g/°C. |
| Thermal stability | ~1300° C. |
| Electrical Resistivity | $10^8$ r cm |

EXAMPLE 10

Creamy masses having molar ratios of K:Al:P of 1:7:8 and 1:10:8 respectively are prepared from 85% $H_3PO_4$, $Al_2O_3 \cdot 3H_2O$ and $K_2CO_3$ (anhydrous) by the procedure described in Example 1. Potassium bicarbonate foaming agent in an amount of 1% by weight of creamy mass, was added to each of the two creamy masses during the mixing step of the preparation process. The 1:7:8 creamy mass had reached a viscosity of about 16,000 cps when the potassium bicarbonate was added, and the 1:10:8 creamy mass had reached a viscosity of about 50,000 cps. The reactive masses began to foam when the potassium bicarbonate was added, and foaming was completed in about 10 minutes. The foamed compositions self-cured (set) at room temperature to form hard, solid cellular structures in from about 1 to about 2 hours. Samples of the foamed and self-cured material were then subjected to additional curing at elevated temperatures and the properties of the cured products determined. The curing temperatures used and properties obtained are shown in Table IV.

TABLE IV

PROPERTIES OF LIGHT WEIGHT FOAMED 1:7:8 AND 1:10:8 K:Al:P COMPOSITIONS

| | 1:7:8 KAlP | 1:10:8 KAlP | |
| --- | --- | --- | --- |
| Cure temperature (°C.)/time (hours) | 50/24 | 50/24 | 600/12 |
| Density (g/cm$^3$) | 0.59 | 0.40 | 0.32 |
| Thermal conductivity, cal/sec · cm · °C. | $3.3 \times 10^{-4}$ | $3.4 \times 10^{-4}$ | $1.5 \times 10^{-4}$ |

EXAMPLE 11

Foamed and nonfoamed creamy masses having K:Al:P molar ratios of 1:6:8 and 1:10:8 were prepared in accordance with the procedures described in the previous examples, except that, in the case of the foamed compositions the foaming agent ($K_2CO_3$) was used in an amount of 2% by weight of unfoamed composition. The compositions were then applied to 15 cm × 46 cm plywood and polyurethane foam panels which were contained by molds having edges either 0.6 cm or 1.3 cm higher than the substrate in each case. Demolding after one to two hours produced white lustrous coatings which were hard to the touch and adhered strongly to the substrates. The coated panels were cured at 50° C. for 24 hours, after which they were subjected to a radiant panel test (ASTM E162) for 15 minutes to determine the ability of the coatings to protect the flammable substrates from radiant heat.

The results of the radiant panel tests are shown on Table V.

TABLE V

RADIANT PANEL TEST RESULTS

| Run No. | Molar Ratio of K:Al:P in slurry | Final* Viscosity (cps) | Foaming Agent |
| --- | --- | --- | --- |
| 1 | 1:6:8 | >40,000 | — |
| 2 | 1:6:8 | 30,000 | 2% $K_2CO_3$ |
| 3 | 1:8:8 | >40,000 | — |
| 4 | 1:8:8 | 7,000 | — |
| 5 | 1:8:8 | 24,000 | 2% $K_2CO_3$ |

| Run No. | Coating Density (gm/cm$^3$) | Coating Thickness (cm) | Substrate | ASTM E162 |
| --- | --- | --- | --- | --- |
| 1 | 1.60 | 0.64 | wood | pass |
| 2 | 0.99 | 1.27 | wood | pass |
| 3 | 1.68 | 0.64 | wood | pass |
| 4 | 1.79 | 1.27 | PU foam | pass |
| 5 | 0.59 | 0.64 | PU foam | pass |

*"Final Viscosity" is measured just before pouring nonfoamed compositions on substrates, and just before foaming agent is added to foaming compositions.

The radiant panel test results indicate that the foamed and nonfoamed compositions effectively protect flammable substrates from radiant heat (i.e., no ignition of the substrates was observed).

EXAMPLE 12

A creamy mass having a K:Al:P molar ratio of 1:8:8 was prepared from 85% $H_3PO_4$, $Al_2O_3.3H_2O$, and anhydrous $K_2CO_3$ in accordance with the procedure described in Example 1. The creamy mass (36 parts by weight) was then mixed in a Hobart blender at room temperature for ten minutes with a previously equilibrated mixture of 32 parts by weight vermiculite (medium grade) and 32 parts by weight water. The resulting kneadable mixture was used both to form molded objects and to form a 1.3 cm thick coating on a plywood board. Both were cured at 50° C. for 24 hours. The cured molded object was hard and brown-colored, and had a density of about 1 g/cm$^3$. The cured coating on the plywood adhered well, was hard and brown colored and had a density of about 1 g/cm$^3$.

EXAMPLE 13

A 1.3 cm. thick coating, formulated as described in Example 12 except that the creamy mass had a K:Al:P molar ratio of 1:7:8, was applied to a panel of rigid polyurethane foam having dimensions 2.5×53×244 cm., and allowed to cure at ambient temperature for several days. The coated panel was then subjected to a 25 ft. (7.6 meters) Flame Tunnel Test (ASTM E84). The coating effectively protected the polyurethane substrate and no ignition occurred after a 20 minute exposure.

EXAMPLE 14

A creamy mass having a K:Al:P molar ratio of 1:6:8 was prepared in accordance with the procedure described in Example 1. The viscosity of the mass was measured at various time intervals following the addition at various time intervals following the addition of the $Al_2O_2.3H_2O$ (the last component to be added).

The viscosity at various time intervals is tabulated in Table VI.

This Example illustrates the reactivity of the compositions of the present invention.

TABLE VI

VISCOSITY OF CREAMY MASS

| Time (hrs.) | Viscosity (cps) | Comment |
| --- | --- | --- |
| 0 | (~120) | Start $Al_2O_3.3H_2O$ add'n |
| 0.3 | | End $Al_2O_3.3H_2O$ add'n |
| 1.3 | 2,600 | |
| 1.8 | 4,400 | |
| 2.0 | 6,000 | |
| 2.3 | 10,000 | |
| 2.6 | 12,400 | |
| 2.9 | 19,000 | |
| 3.1 | ~100,000 | Creamy mass began to set |

EXAMPLE 15

A plywood panel having a thickness of 1.3 cm was coated with a 0.6 cm thick coating of a non-foamed potassium-aluminum-phosphate composition of the present invention having a K:Al:P ratio of 1:8:8. A 2.5 cm thick panel of rigid polyurethane was similarly coated with a nonfoamed potassium-aluminum-phosphate composition of the present invention having a K:Al:P ratio of 1.3:8:8. The coatings were allowed to set at room temperature for about 2 hours, and were then cured in a 50° C. oven for about 24 hours.

The coated panels were then stored for about 8 months at room temperature.

Each panel was then cut with a band saw. The cuts through the coating as well as the substrates were smooth, and no separation of the coating from the substrate could be observed.

We claim:

1. A solid potassium-aluminum-phosphate composition of matter having the nominal formula:

$$(K_2O)_x(Al_2O_3)_y(P_2O_5)_8(H_2O)_n$$

wherein x represents a number ranging from about 0.3 to about 2, y represents a number ranging from about 3 to about 15 and n represents a number ranging up to about 100; comprising a hydrated oxide of aluminum and at least one potassium-aluminum-phosphate species selected from the group consisting of:

$$KAl_3H_8(PO_4)_6 \cdot 6H_2O$$

$$KAl_3H_{14}(PO_4)_8 \cdot 4H_2O \text{ and}$$

$$K_3Al_5H_6(PO_4)_8 \cdot 18H_2O$$

self-bound into a solid mass.

2. The composition of claim 1 wherein n represents a number ranging from 12 to about 100.

3. The composition of claim 1 wherein x represents 1 and y represents 6.

4. The composition of claim 1 wherein x represents 1 and y represents 7.

5. The composition of claim 1 wherein x represents 1 and y represents 8.

6. The composition of claim 1 wherein x represents 1 and y represents 10.

7. The composition of claim 1 wherein x represents 1.3 and y represents 6.

8. The composition of claim 1 wherein x represents 1.3 and y represents 8.

9. The composition of claim 1 wherein x represents 1.3 and y represents 10.

10. The composition of claim 1 further characterized as also including a filler.

11. The composition of claim 10 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

12. The article of manufacture resulting from the setting, curing or setting and curing of a reactive mass formed by mixing (a) a potassium source, (b) an aluminum source (c) a phosphate source and (d) water for a time sufficient to form a reactive creamy mass comprising a hydrated oxide of aluminum and at least one potassium-aluminum-phosphate species selected from the group consisting of:

$$KAl_3H_8(PO_4)_6 \cdot 6H_2O$$

$$KAl_3H_{14}(PO_4)_8 \cdot 4H_2O$$

$$K_3Al_5H_6(PO_4)_8 \cdot 18H_2O.$$

13. The article of claim 12 wherein said potassium source is a compound selected from the group consisting of potassium hydroxide, potassium oxide, potassium carbonate, potassium bicarbonate, and potassium salts of phosphoric acid.

14. The article of claim 13 wherein said potassium source is potassium carbonate.

15. The article of claim 14 wherein said aluminum source is a hydrated oxide of aluminum.

16. The article of claim 15 wherein said phosphate source is phosphoric acid having a concentration of about 85% by weight $H_3PO_4$.

17. The article of claim 16 wherein said phosphoric acid is also a source of said water.

18. The article of claim 17 wherein the amount of said aluminum source is such as to result in the presence of from about 3 moles of aluminum oxide to about 15 moles of aluminum oxider per 8 moles of $P_2O_5$ in the slurry; and the amount of said potassium source is such as to result in the presence of from about 0.3 moles to about 2 moles of potassium oxide per 8 moles $P_2O_5$ in the slurry.

19. The article of claim 18 wherein said mixing is continued until said reactive, creamy mass achieves a viscosity of at least 2,000 centipoises.

20. The article of claim 19 wherein said mixing is accomplished by the steps of sequentially:
  (a) mixing said potassium source with said phosphoric acid to form a solution;
  (b) mixing said aluminum source with said solution to form a slurry; and
  (c) mixing said slurry for a period of time sufficient to form a reactive, creamy mass having a viscosity of at least 2,000 centipoises.

21. The article of claim 12 also including a filler.

22. The article of claim 21 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

23. A process for preparing a solid potassium-aluminum-phosphate composition of matter having the nominal formula:

$$(K_2O)_x(Al_2O_3)_y(P_2O_5)_8(H_2O)_n$$

wherein x represents a number ranging from about 0.3 to 2, y represents a number ranging from about 3 to about 15 and n represents a number ranging up to about 100, said composition comprising a hydrated oxide of aluminum and at least one potassium-aluminum-phosphate species selected from the group consisting of:

$$KAl_3H_8(PO_4)_6 \cdot 6H_2O$$

$$KAl_3H_{14}(PO_4)_8 \cdot 4H_2O$$

$$K_3Al_5H_6(PO_4)_8 \cdot 18H_2O$$

self-bound into a solid mass; said process comprising the steps of:
  (a) mixing a potassium source, an aluminum source, a phosphate source and water to form a slurry;
  (b) mixing said slurry for a time sufficient to convert said slurry to a reactive, creamy mass; and
  (c) setting, curing or setting and curing said reactive, creamy mass to form said solid potassium-aluminum-phosphate composition of matter.

24. The process of claim 23 wherein said potassium source is selected from the group consisting of potassium hydroxide, potassium oxide, potassium carbonate, potassium bicarbonate, and potassium salts of phosphoric acid.

25. The process of claim 24 wherein said potassium source is potassium carbonate.

26. The process of claim 23 wherein said source of aluminum is a hydrated oxide of aluminum.

27. The process of claim 26 wherein said source of aluminum is aluminum oxide trihydrate.

28. The process of claim 23 wherein said phosphate source is a compound selected from the group consisting of phosphoric acid, phosphorus pentoxide, aluminum dihydrogen phosphate and the aluminum salts of phosphoric acid.

29. The process of claim 25 wherein said mixing is continued until the viscosity of said reactive, creamy mass increases to at least 2,000 centipoises.

30. The process of claim 23 wherein said setting, curing, or setting and curing is accomplished by exposing said reactive, creamy mass to a temperature ranging from about 20° C. to about 1200° C. for at least a period of time sufficient to convert it to a solid.

31. The process of claim 30 wherein said temperature is maintained in the range of from about 20° C. to about 50° C. until said reactive, creamy mass is converted to a solid.

32. The process of claim 31 wherein said solid is then cured at a temperature ranging from about 45° C. to 120° C.

33. The process of claim 32 wherein said solid is then cured at a temperature ranging from about 120° C. to about 600° C.

34. A composition which is capable of self setting at room temperature to form a solid mass, comprising a reactive, creamy mass prepared by the steps of:
(a) mixing a potassium source, an aluminum source, a phosphate source and a source of water to form a slurry; and (b) mixing said slurry to a reactive, creamy mass comprising a hydrated oxide of aluminum and at least one potassium-aluminum-phosphate species selected from the group consisting of:

$KAl_3H_8(PO_4)_6 \cdot 6H_2O$ $KAl_3H_{14}(PO_4)_8 \cdot 4H_2O$ $K_3Al_5H_6(PO_4)_8 \cdot 18H_2O$.

35. The composition of claim 34 wherein said potassium source is selected from the group consisting of potassium hydroxide, potassium oxide, potassium carbonate, potassium bicarbonate and potassium salts of phosphoric acid.

36. The composition of claim 35 wherein said potassium source is potassium carbonate.

37. The composition of claim 36 wherein said source of aluminum is a hydrated oxide of aluminum.

38. The composition of claim 34 wherein said phosphate source is selected from the group consisting of phosphoric acid, phosphorus pentoxide, aluminum dihydrogen phosphate and the aluminum salts of phosphoric acid.

39. The composition of claim 38 wherein said phosphate source is phosphoric acid.

40. The composition of claim 39 wherein said phosphoric acid is also a source of said water.

41. The composition of claim 40 wherein said mixing of said potassium source, said aluminum source, said phosphate source and said water source is accomplished by the steps of sequentially:
(a) mixing said potassium source with said phosphoric acid to form a solution; and
(b) mixing said aluminum source with said solution to form said slurry.

42. The composition of claim 34 also including a filler.

43. The composition of claim 42 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

44. A composition which is capable of selfsetting at room temperature to form a solid cellular mass, comprising a foamed reactive, creamy mass prepared by mixing a potassium source, an aluminum source, a phosphate source and a water source to form a slurry; mixing said slurry for a time sufficient to convert said slurry to a reactive, creamy mass; comprising a hydrated oxide of aluminum and at least one potassium-aluminum-phosphate species selected from the group consisting of:

$KAl_3H_8(PO_4)_6 \cdot H_2O$ $KAl_3H_{14}(PO_4)_8 \cdot 4H_2O$ $K_3Al_5H_6(PO_4)_8 \cdot 18H_2O$ and adding a foaming agent to said reactive, creamy mass.

45. The composition of claim 44 wherein said foaming agent is selected from the group consisting of potassium carbonate, potassium bicarbonate, sodium carbonate, sodium bicarbonate, air, nitrogen and carbon dioxide.

46. The composition of claim 45 wherein said potassium source is selected from the group consisting of potassium hydroxide, potassium oxide, potassium carbonate, potassium bicarbonate and potassium salts of phosphoric acid.

47. The composition of claim 46 wherein said potassium source is potassium carbonate.

48. The composition of claim 45 wherein said source of aluminum is a hydrated oxide of aluminum.

49. The composition of claim 45 wherein said phosphate source is selected from the group consisting of phosphoric acid, phosphorus pentoxide, aluminum dihydrogen phosphate, and the aluminum salts of phosphoric acid.

50. The composition of claim 49 wherein said phosphate source is phosphoric acid.

51. The composition of claim 49 wherein said phosphoric acid is also a source of said water.

52. The composition of claim 51 wherein said mixing of said potassium source, said aluminum source, said phosphate source and said water source is accomplished by the steps of sequentially
(a) mixing said potassium source with said phosphoric acid to form a solution; and
(b) mixing said aluminum source with said solution to form said slurry.

53. The composition of claim 44 also including a filler.

54. The composition of claim 53 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

55. A cellular solid potassium-aluminum-phosphate composition of matter having the nominal formula:

$$(K_2O)_x(Al_2O_3)_y(P_2O_5)_8(H_2O)_n$$

wherein x represents a number ranging from about 0.3 to about 2, y represents a number ranging from about 3 to about 15 and n represents a number ranging up to about 100; comprising a hydrated oxide of aluminum and at least one potassium-aluminum-phosphate species selected from the group consisting of:

$$KAl_3H_8(PO_4)_6 \cdot 6H_2O$$

$$KAl_3H_{14}(PO_4)_8 \cdot H_2O$$

$$K_3Al_5H_6(PO_4)_8 \cdot 18H_2O$$

self-bound into a solid cellular mass.

56. The composition of claim 55 wherein n represents a number ranging from 12 to about 100.

57. The composition of claim 55 wherein x represents 1 and y represents 6.

58. The composition of claim 55 wherein x represents 1 and y represents 7.

59. The composition of claim 55 wherein x represents 1 and y represents 8.

60. The composition of claim 55 wherein x represents 1 and y represents 10.

61. The composition of claim 55 wherein x represents 1.3 and y represents 6.

62. The composition of claim 55 wherein x represents 1.3 and y represents 10.

63. The composition of claim 55 wherein x represents 1.3 and y represents 8.

64. The composition of claim 55 further characterized as also including a filler.

65. The composition of claim 64 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

66. An article of manufacture resulting from the setting or curing of a foamed reactive, creamy mass formed by mixing (a) a potassium source, (b) an aluminum source, (c) a phosphate source and (d) water for a period of time sufficient to form a reactive, creamy mass comprising a hydrated oxide of aluminum and at least one potassium-aluminum-phosphate species selected from the group consisting of:

$$KAl_3(PO_4)_6 \cdot 6H_2O$$

$$KAl_3H_{14}(PO_4)_8 \cdot 4H_2O$$

$$K_3Al_5H_6(PO_4)_8 \cdot 18H_2O,$$

and causing said reactive, creamy mass to foam.

67. The article of claim 66 wherein said reactive, creamy mass is caused to foam by the addition thereto of a foaming agent.

68. The article of claim 67 wherein said foaming agent is selected from the group consisting of potassium carbonate, potassium bicarbonate, sodium carbonate, sodium bicarbonate, air, nitrogen and carbon dioxide.

69. The article of claim 68 wherein said potassium source is selected from the group consisting of potassium oxide, potassium hydroxide, potassium carbonate, potassium bicarbonate, and potassium salts of phosphoric acid.

70. The article of claim 69 wherein said potassium source is potassium carbonate.

71. The article of claim 65 wherein said source of aluminum is a hydrated oxide of aluminum.

72. The article of claim 66 wherein said phosphate source is selected from the group consisting of phosphoric acid, phosphorus pentoxide, aluminum dihydrogen phosphate, and the aluminum salts of phosphoric acid.

73. The article of claim 72 wherein said phosphate source is phosphoric acid.

74. The article of claim 73 wherein said phosphoric acid is also a source of said water.

75. The article of claim 74 wherein said mixing of said potassium source, said aluminum source, said phosphate source and said water source is accomplished by the steps of sequentially
(a) mixing said potassium source with said phosphoric acid to form a solution; and
(b) mixing said aluminum source with said solution to form said slurry.

76. The article of claim 66 also including a filler.

77. The article of claim 76 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

78. A process for forming a solid cellular potassium-aluminum-phosphate composition of matter having the nominal formula:

$$(K_2O)_x(Al_2O_3)_y(P_2O_5)_8(H_2O)_n$$

wherein x represents a number ranging from about 0.3 to 2, y represents a number ranging from about 3 to about 15 and n represents a number ranging up to about 100, said composition comprising a hydrated oxide of aluminum and at least one potassium-aluminum-phosphate species selected from the group consisting of:

$$KAl_3H_3(PO_4)_6 \cdot 6H_2O$$

$$KAl_3H_{14}(PO_4)_8 \cdot 4H_2O$$

$$K_3Al_5H_6(PO_4)_8 \cdot 18H_2O$$

self-bound into a solid, cellular mass; said process comprising the steps of:
(a) mixing a potassium source, an aluminum source, a phosphate source and water to form a slurry;
(b) mixing said slurry for a time sufficient to convert said slurry to a reactive, creamy mass;
(c) causing said reactive, creamy mass to foam; and
(d) setting, curing, or setting and curing said foamed reactive, creamy mass to form said solid cellular potassium-aluminum-phosphate composition of matter.

79. The process of claim 78 wherein said reactive, creamy mass is caused to foam by the addition thereto of a foaming agent.

80. The process of claim 79 wherein said foaming agent is selected from the group consisting of potassium carbonate, potassium bicarbonate, sodium carbonate, sodium bicarbonate, air, nitrogen and carbon dioxide.

81. The process of claim 78 wherein said potassium source is selected from the group consisting of potassium oxide, potassium hydroxide, potassium carbonate and potassium salts of phosphoric acid.

82. The process of claim 81 wherein said potassium source is potassium carbonate.

83. The process of claim 78 wherein said source of aluminum is a hydrated aluminum oxide.

84. The process of claim 78 wherein said phosphate source is selected from the group consisting of phosphoric acid, phosphorus pentoxide, aluminum dihydrogen phosphate and the aluminum salts of phosphoric acid.

85. The process of claim 84 wherein said phosphate source is phosphoric acid.

86. The process of claim 85 wherein said phosphoric acid is also a source of said water.

87. The process of claim 86 wherein said mixing of said potassium source, said aluminum source, said phosphate source and said water source is accomplished by the steps of sequentially:
(a) mixing said potassium source with said phosphoric acid to form a solution; and
(b) mixing said aluminum source with said solution to form said slurry.

88. The process of claim 78 also including the step of adding a filler.

89. The process of claim 87 wherein said filler is selected from the group consisting of main group metal oxides, such as aluminum oxide, and their hydrates; transition metal oxides, such as $Fe_2O_3$, and their hydrates, silica, asbestos, calcium silicate, Wollastonite, perlite, vermiculite, wood chips, sawdust, cellulose fiber, glass fiber, glass flake, pumice, mica, clay, magnetic powder, magnetic filings and mixtures thereof.

* * * * *